United States Patent [19]

Chi

[11] Patent Number: 5,267,485
[45] Date of Patent: Dec. 7, 1993

[54] UPPER BEARING ASSEMBLY FOR A BICYCLE STEERER TUBE

[76] Inventor: Yi-Chen Chi, No. 139-5, An Mei Rd., Mei Shan Village, Hou Li Hsiang, Taichung Hsien, Taiwan

[21] Appl. No.: 58,952

[22] Filed: May 7, 1993

[51] Int. Cl.$^5$ ............................................. B62K 21/18
[52] U.S. Cl. .................. 74/551.1; 280/279; 384/541
[58] Field of Search ............... 74/551.1; 384/499, 512, 384/536, 540, 541, 545; 280/279, 280

[56] References Cited

U.S. PATENT DOCUMENTS

| | | | |
|---|---|---|---|
| 3,239,292 | 3/1966 | Howe et al. | 384/541 |
| 3,306,684 | 2/1967 | Klein, Jr. | 280/279 |
| 4,268,055 | 5/1981 | Bell | 280/279 X |
| 4,310,260 | 1/1982 | Katayama | 74/551.1 X |
| 4,403,814 | 9/1983 | Koss et al. | 384/541 |
| 4,436,468 | 3/1984 | Ozaki et al. | 280/279 X |
| 4,466,629 | 8/1984 | Sinyard | 280/279 |
| 4,593,924 | 6/1986 | Cabeza | 280/279 |
| 4,854,750 | 8/1989 | Larin | 384/541 |
| 4,960,342 | 10/1990 | Chi | 280/279 |
| 5,163,758 | 11/1992 | Chi | 280/279 |

FOREIGN PATENT DOCUMENTS

| | | | |
|---|---|---|---|
| 446753 | 6/1927 | Fed. Rep. of Germany | 280/279 |
| 12250 | of 1890 | United Kingdom | 280/279 |

Primary Examiner—Leslie A. Braun
Assistant Examiner—Ryan Massey
Attorney, Agent, or Firm—Merchant, Gould, Smith, Edell, Welter & Schmidt

[57] ABSTRACT

An upper bearing assembly for a bicycle steerer tube which generally includes a lower race, a ball bearing integral with an upper race and mounted in the lower race, a watertight cover mounted above the ball bearing, a compression nut mounted above the watertight cover, a compression washer mounted around a top portion of a substantially inverted T-shaped cutout of the compression nut, a compression cap mounted above the compression washer and having a skirt portion surrounding the compression washer. The compression washer includes a thinner portion and a thicker portion which has a substantially V-shaped groove formed in an outer periphery thereof. The skirt portion of the compression cap has a threaded hole extending obliquely therein in which a compression bolt locates. The oblique threaded hole aligns with the V-shaped groove in the compression washer. When the compression bolt is driven at a first end thereof and is thus moved inward in the oblique threaded hole, the second end of the compression bolt contacts and compresses the compressing washer at the V-shaped groove, the compression cap, the compression washer, the compression nut, and the steerer tube as a whole are tightly engaged together.

5 Claims, 4 Drawing Sheets

UPPER BEARING ASSEMBLY FOR A BICYCLE STEERER TUBE

BACKGROUND OF THE INVENTION

The present invention relates to an improved upper bearing assembly for a bicycle steerer tube.

In a bicycle, the steerer tube is rotatable relative to the head tube by means of upper and lower bearing assemblies which are conventionally coupled to the steerer tube by threading engagement which tends to be loosened due to vibrations during cycling. Complicated designs have been proposed to solve this problem, but cause the whole structure to become intolerably intricate.

The present invention provides an improved upper bearing assembly to mitigate and/or obviate the above-mentioned problem.

SUMMARY OF THE INVENTION

The present invention provides an upper bearing assembly which generally includes a lower race, a ball bearing integral with an upper race and mounted in the lower race, a watertight cover mounted above the ball bearing, a compression nut mounted above the watertight cover, a compression washer mounted around a top portion of a substantially inverted T-shaped cutout of the compression nut, a compression cap mounted above the compression washer and having a skirt portion surrounding the compression washer. A sealing ring may be provided between the outer periphery of the steerer tube and the inner periphery of the compression cap.

The compression washer includes a thinner wall portion and a thicker wall portion which has a substantially V-shaped groove formed in an outer periphery thereof. The skirt portion of the compression cap has a threaded hole extending obliquely therein in which a compression bolt locates. The oblique threaded hole aligns with the V-shaped groove in the compression washer.

When the compression bolt is driven at a first end thereof and is thus moved inward in the oblique threaded hole, the second end of the compression bolt contacts and compresses the compressing washer at the V-shaped groove. This urges the thicker portion of the compression washer to compress the compression nut, which results in a horizontal force between the compression cap, the compression washer, and the compression nut. Accordingly, the width of the upper portion of the inverted T-shaped cutout decreases. Since the inner diameter of the compression nut decreases, the compression cap, the compression washer, the compression nut, and the steerer tube as a whole are tight, i.e., the upper bearing assembly is securely mounted around the upper periphery of the steerer tube for steering function and the resultant structure is not easy to be loosened under vibrations during cycling.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
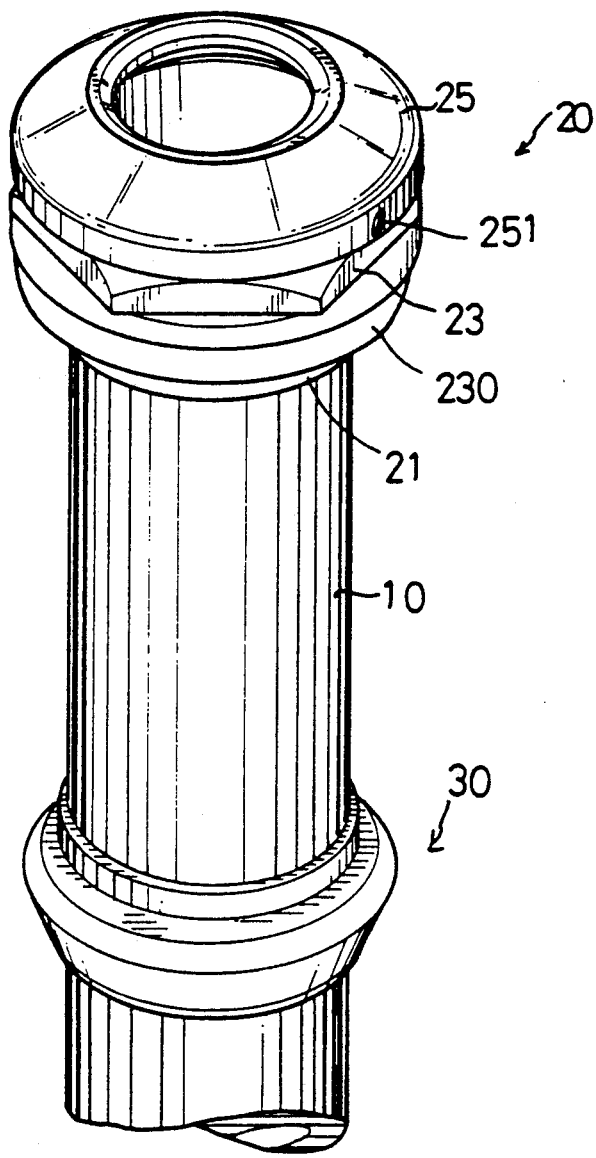
FIG. 1 is a perspective view of a bicycle steerer tube with a lower bearing assembly and an upper bearing assembly in accordance with the present invention.
Figure 2:
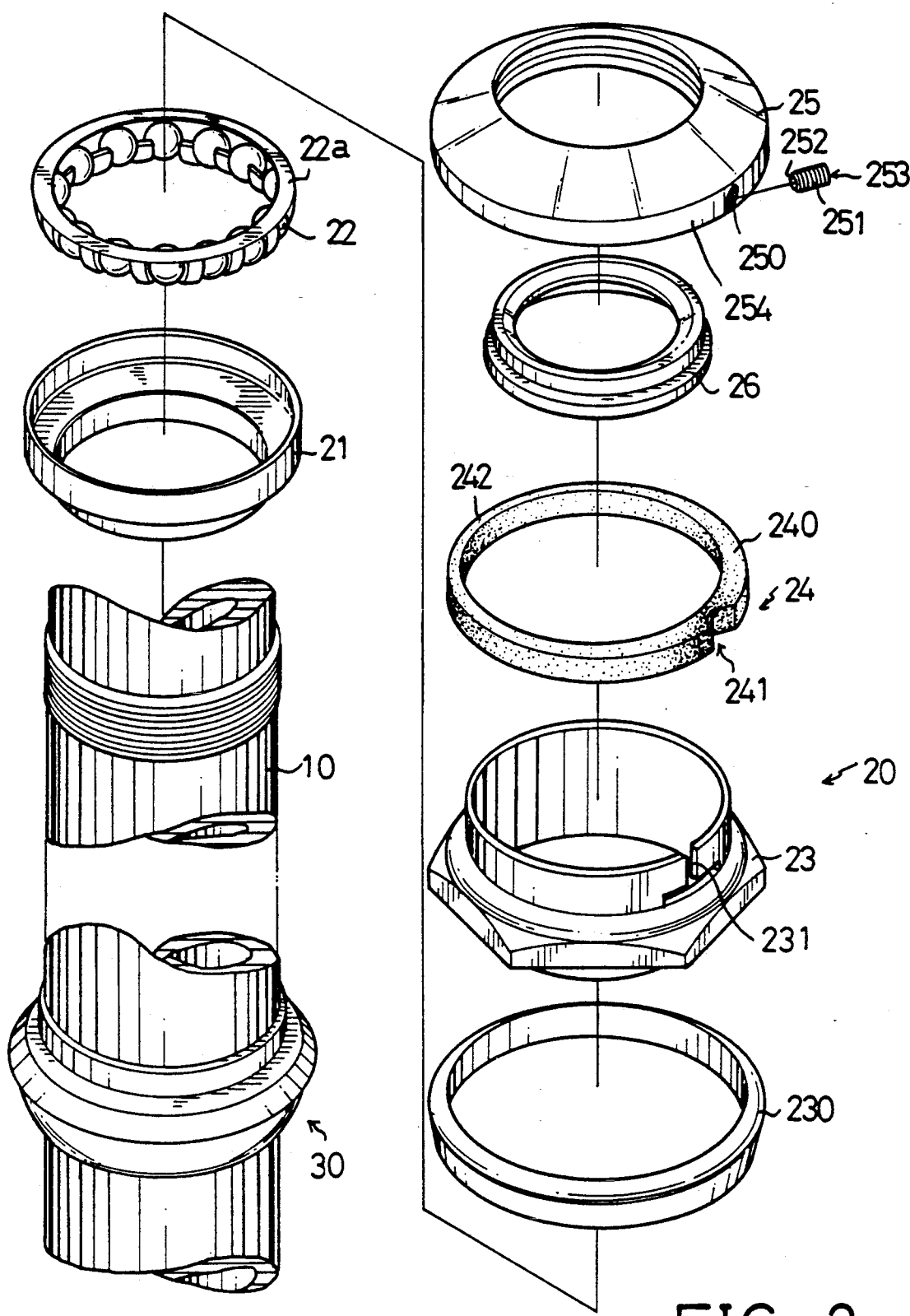
FIG. 2 is an exploded view showing the construction of the upper bearing assembly in accordance with the present invention.
Figure 3:
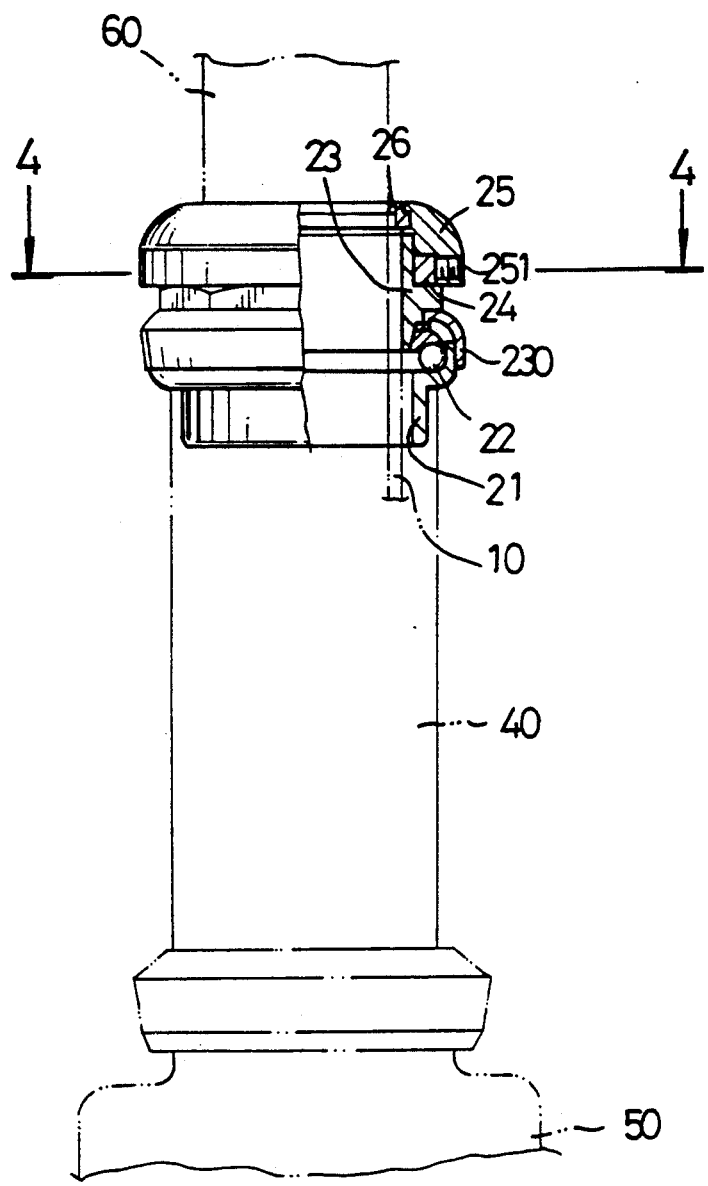
FIG. 3 is a partial cross-sectional view of the upper bearing assembly and further illustrates the application of the whole structure.

Referring to FIGS. 1 through 3, in a bicycle, a steerer tube 10 is rotatably mounted in a head tube 40 by means of an upper bearing assembly 20 at an upper portion thereof and a lower bearing assembly 30 at a lower portion thereof. The lower end of the steerer tube 10 is securely coupled to a front fork 50 and the upper end of the steerer tube 10 defines an opening to securely engage with a handlebar stem 60. The present invention relates to an improvement in the upper bearing assembly 20.

Still referring to FIGS. 1 through 3, the upper bearing assembly 20 in accordance with the present invention generally includes a lower race 21 mounted around the steerer tube 10, a ball bearing 22 integral with an upper race 22a and mounted in the lower race 21, a watertight cover 230 mounted above the ball bearing 22, a compression nut 23 mounted above the watertight cover 230, a compression washer 24 mounted around a top portion of a substantially inverted T-shaped cutout 231 of the compression nut 23, a compression cap 25 mounted above the compression washer 24 and having a skirt portion 254 surrounding the compression washer 24. A sealing ring 26 may be provided between the outer periphery of the steerer tube 10 and the inner periphery of the compression cap 25.

As shown in FIG. 2, the wall thickness of the compression washer 24 varies, i.e., the compression washer 24 includes a thinner wall portion 242 and a thicker wall portion 240 which has a substantially V-shaped groove 241 formed in an outer periphery thereof. The skirt portion 254 of the compression cap 25 has a threaded hole 250 extending obliquely therein in which a compression bolt 251 locates. The oblique threaded hole 250 aligns with the V-shaped groove 241 in the compression washer 24.

Figure 4:
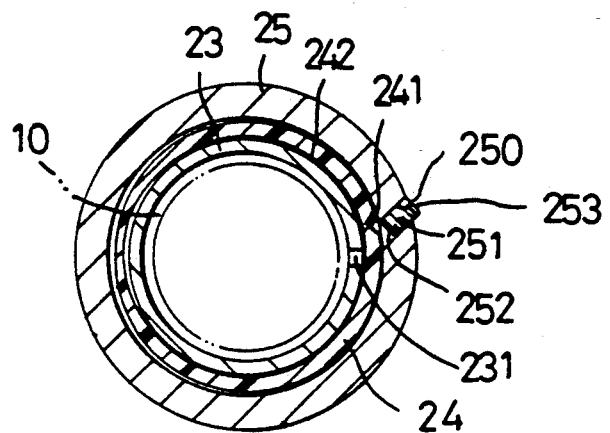
FIG. 4 is a cross-sectional view of the upper bearing assembly taken along line 4—4 in FIG. 3, wherein the compression washer is loose.
Figure 5:
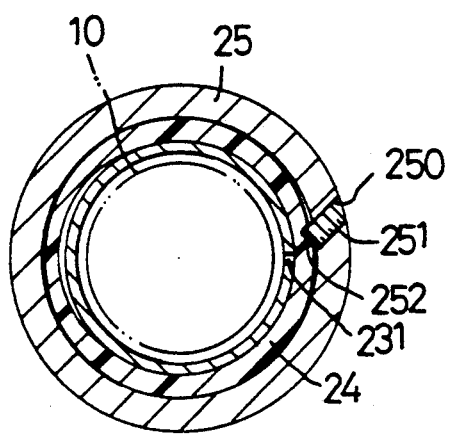
FIG. 5 is a cross-sectional view similar to FIG. 4, wherein the compression washer is compressed.

Referring now to FIG. 4 in which the compression washer 24 is in a loose engagement with the compression nut 23, that is, a clearance 242 exists if the former is not urged by the compression bolt 251. If the user uses a tool, such as a screw driver, to drive the compression bolt 251 at a first end 253 thereof to urge the compression bolt 251 to move inward in the oblique threaded hole 250, the second end 252 contacts and compresses the compression washer 24 at the V-shaped groove 241. This urges the thicker portion 240 of the compression washer 24 to compress the compression nut 23, which results in a horizontal force between the compression cap 25, the compression washer 24, and the compression nut 23. Accordingly, the width of the upper portion of the inverted T-shaped cutout 231 decreases, i.e., the inner diameter of the compression nut 23 decreases. Accordingly, the compression cap 25, the compression washer 24, the compression nut 23, and the steerer tube 10 as a whole are tight, i.e., the upper bearing assembly 20 is securely mounted around the upper periphery of the steerer tube 10 for steering function and the resultant structure is not easy to be loosened under vibrations during cycling.

Although the invention has been explained in relation to its preferred embodiment, it is to be understood that many other possible modifications and variations can be made without departing from the spirit and scope of the invention as hereinafter claimed.

I claim:

1. An upper bearing assembly for a bicycle steerer tube comprising:
    a lower race adapted to be mounted around a steerer tube;
    a ball bearing integral with an upper race and mounted in said lower race;
    a compression nut (23) mounted above said ball bearing, comprising a cutout;
    a compression washer mounted around a top portion of said cutout of said compression nut, said compression washer including a thinner wall portion and a thicker wall portion which has a groove formed in an outer periphery thereof;
    a compression cap mounted above said compression washer and having a skirt portion surrounding said compression washer, said skirt portion of said compression cap having a threaded hole which extends obliquely therein and aligns with said groove in said compression washer, a compression bolt being disposed in said oblique thread hole for urging said compression cap, said compression washer, said compression nut, and said steerer tube to be tightly engaged together.

2. The upper bearing assembly as claimed in claim 1 wherein said groove is substantially V-shaped.

3. The upper bearing assembly as claimed in claim 1 wherein said cutout is substantially inverted T-shaped.

4. The upper bearing assembly as claimed in claim 1 wherein a sealing ring is provided between an outer periphery of said steerer tube and an inner periphery of said compression cap.

5. The upper bearing assembly as claimed in claim 1 wherein a watertight cover is provided between said ball bearing and said compression nut (23).

* * * * *